(12) United States Patent
Breuer et al.

(10) Patent No.: US 8,538,674 B2
(45) Date of Patent: Sep. 17, 2013

(54) VEHICLE COLLISION AVOIDANCE APPARATUS AND METHOD

(75) Inventors: Karsten Breuer, Lauenau (DE); Hartmut Kitterer, Neu-Ulm (DE)

(73) Assignee: WABCO GmbH, Hannover (DE)

( * ) Notice: Subject to any disclaimer, the term of this patent is extended or adjusted under 35 U.S.C. 154(b) by 316 days.

(21) Appl. No.: 12/735,217

(22) PCT Filed: Oct. 23, 2008

(86) PCT No.: PCT/EP2008/009088
§ 371 (c)(1),
(2), (4) Date: Sep. 1, 2010

(87) PCT Pub. No.: WO2009/086857
PCT Pub. Date: Jul. 16, 2009

(65) Prior Publication Data
US 2011/0015818 A1 Jan. 20, 2011

(30) Foreign Application Priority Data
Jan. 4, 2008 (DE) .......................... 10 2008 003 205

(51) Int. Cl.
*G08G 1/16* (2006.01)
*B60W 30/09* (2012.01)
*B60W 30/188* (2012.01)
*B60T 8/1755* (2006.01)
*B60K 31/00* (2006.01)

(52) U.S. Cl.
CPC ........... *B60W 30/09* (2013.01); *B60W 30/1884* (2013.01); *B60T 8/17558* (2013.01); *B60K 31/0008* (2013.01); *B60T 2201/022* (2013.01); *B60T 2201/024* (2013.01); *G08G 1/16* (2013.01)

USPC ............................................. 701/301; 340/436

(58) Field of Classification Search
CPC .......... B60T 8/17558; B60T 2201/022; B60T 2201/024; B60W 30/085; B60W 30/09
USPC ......................................................... 701/29
See application file for complete search history.

(56) References Cited

U.S. PATENT DOCUMENTS

| 4,648,290 | A | * | 3/1987 | Dunkley et al. | ................. | 477/78 |
| 5,952,939 | A | * | 9/1999 | Nakazawa et al. | ............ | 340/903 |
| 6,226,593 | B1 | * | 5/2001 | Kurz et al. | ..................... | 701/301 |

(Continued)

FOREIGN PATENT DOCUMENTS

| EP | 1 559 607 A1 | 8/2005 |
| WO | WO 2007/055215 A1 | 5/2007 |
| WO | WO 2007/132323 A2 | 11/2007 |

*Primary Examiner* — James Trammell
*Assistant Examiner* — Todd Melton
(74) *Attorney, Agent, or Firm* — Kramer Levin Naftalis & Frankel LLP (57) ABSTRACT

The present invention relates to a device for avoiding collision or for minimizing the collision severity in case of a collision, for vehicles, particularly for commercial vehicles, comprising an input unit for inputting criteria related to traffic conditions, and for determining threshold values related to traffic conditions, a detection unit for detecting objects in the environment of the vehicle, a measurement unit for determining the motion condition of the vehicle, a controller for processing the information obtained from the input unit, the detection unit, and the measuring unit, and for generating control signals for controlling the components related to the motion state of the vehicle, and an output unit for outputting the generated control signals. The invention further relates to a corresponding method and a computer program.

19 Claims, 5 Drawing Sheets

(56) References Cited

U.S. PATENT DOCUMENTS

| | | | |
|---|---|---|---|
| 6,567,749 B2 * | 5/2003 | Matsuura | 701/301 |
| 6,665,614 B2 * | 12/2003 | Sekiguchi | 701/301 |
| 7,124,027 B1 * | 10/2006 | Ernst et al. | 701/301 |
| 7,145,441 B2 * | 12/2006 | Knoop et al. | 340/435 |
| 7,363,155 B2 * | 4/2008 | Meister et al. | 701/301 |
| 7,453,374 B2 * | 11/2008 | Koike et al. | 340/903 |
| 7,696,863 B2 * | 4/2010 | Lucas et al. | 340/435 |
| 7,864,033 B2 * | 1/2011 | Imura et al. | 340/436 |
| 7,885,766 B2 * | 2/2011 | Sugimoto et al. | 701/301 |
| 7,966,127 B2 * | 6/2011 | Ono et al. | 701/300 |
| 2004/0034460 A1 * | 2/2004 | Folkerts et al. | 701/54 |
| 2005/0168328 A1 | 8/2005 | Kitterer et al. | |
| 2005/0280520 A1 | 12/2005 | Kubo | |
| 2006/0173621 A1 | 8/2006 | Stopczynski | |
| 2007/0046449 A1 | 3/2007 | Koike et al. | |
| 2007/0299610 A1 | 12/2007 | Ewerhart et al. | |
| 2008/0167820 A1 * | 7/2008 | Oguchi et al. | 701/301 |
| 2008/0189040 A1 * | 8/2008 | Nasu et al. | 701/301 |
| 2009/0201192 A1 | 8/2009 | Tokoro et al. | |
| 2009/0299593 A1 * | 12/2009 | Borchers | 701/70 |
| 2010/0274435 A1 * | 10/2010 | Kondoh et al. | 701/29 |

\* cited by examiner

VEHICLE COLLISION AVOIDANCE APPARATUS AND METHOD

FIELD OF THE INVENTION

The present invention generally relates to embodiments of an apparatus, method and computer program for avoiding collisions or reducing the severity of collisions for vehicles, in particular commercial vehicles.

BACKGROUND OF THE INVENTION

Vehicles, in particular commercial vehicles, are increasingly being equipped with sensor systems by which the vehicle surroundings can be sensed. Such sensor systems can be used to operate assistance systems and safety systems. The underlying principle of these systems is that a certain value is predefined for a variable that is relevant for the vehicle (setpoint value). In assistance and safety systems, these variables relate, in particular, to the state of movement of the vehicle, for example to the speed of the vehicle. The current value of this variable is measured (actual value) using a suitable measuring system. The current actual value is compared with the setpoint value using a control unit. If the actual value differs from the setpoint value, the control unit generates a control signal with which built-in units, for example a brake system or an engine controller, which relate to the state of movement of the vehicle, can be actuated. The actuation of these built-in units causes the actual value to approach the setpoint value until the two values correspond to one another. In this case, actuation of the brake system or of the engine controller would therefore cause the speed to be changed until the vehicle has reached the predefined speed. For example, a cruise controller is based on this principle.

A further example of such an assistance function that is widely used is adaptive cruise control (ACC). The distance from a vehicle travelling ahead is determined using a distance sensor and is adjusted automatically by means of a cruise control system. Depending on the embodiment, the distance to be maintained from the vehicle travelling ahead can be input manually or permanently predefined at the factory. In addition, the distance to be maintained can be adapted automatically to the current speed of the vehicle. The extent of the distance from the vehicle travelling ahead is an example of a traffic-situation-related criterion or of a traffic-related threshold value. The adjustment of the distance is brought about, for example, by increasing or reducing the torque demand that is made of the engine or additional activation of the brakes. The maximum decelerations triggered by the ACC are, according to the ISO standard, typically significantly below those of full braking operations since the ACC is only a comfort system. The reliability of detection of the distance sensors used today is generally not sufficient to trigger a full braking operation based thereon. For this reason, in these systems, the deceleration is artificially limited in order to avoid placing the driver of the vehicle in question or the traffic following behind in danger in the case of incorrect triggering. In addition, the driver can override such a system at any time by activating, for example, the accelerator pedal or brake pedal. In addition, it lies within the freedom of decision of the driver whether the driver will activate the ACC at all. If, in the case of an active ACC, avoidance of an accident requires a greater deceleration than the maximum deceleration made available by the ACC, it is the driver's responsibility to apply such deceleration. Consequently, ACC systems are only suitable to a very limited degree for avoiding collisions or for reducing the severity of collisions.

EP 1 559 607 A1 describes a method that, regardless of an active ACC, in the event of an imminent collision, requests the driver by means of a warning to carry out an accident-avoiding action, such as for example an emergency braking operation. Furthermore, there are also approaches for avoiding accidents or for reducing the consequences of accidents that are generally referred to as collision mitigation systems (CMS).

Such systems generally use the same distance sensors that are used in ACC systems. The known limitations of ACC systems are, for example, unreliable detection of vehicles that are already stationary or possible incorrect detection, which can be triggered, for example, by multiple reflections at structures along the boundaries of the road (crash barriers, signs, bridges). Precise measurement of the width of the objects and of the lateral offset in relation to the direction of movement of the driver's own vehicle is likewise impossible, or possible only to a very unsatisfactory degree, with the vast majority of the distance sensors available on the market. For this reason, assessment of a possible avoidance manoeuvre, which is customary in collision-avoidance systems, either cannot be carried out at all or can only be carried out very imprecisely. In addition, there is no redundant confirmation of a relevant object, which is necessary for a safety-related system, for example for triggering an autonomous emergency braking operation.

The risk is that, in the case of repeatedly occurring incorrect warnings, the driver tends to ignore the warnings, which can have serious consequences and which makes the systems useless when a hazardous situation actually occurs. In addition, in the case of emergency braking operations that are triggered incorrectly there is also the risk of tail-end collisions with vehicles following behind, which is also unacceptable in a situation that is not critical in terms of collisions.

As a result, nowadays, either significant limitations have to be placed on the performance of such collision-warning/consequence-reducing systems or an increased number of incorrect warnings/incorrect reactions have to be tolerated.

A further sensor-assisted and widespread assistance function is the lane departure warning (LDW) system. LDW systems are video-supported systems for sensing the course of a roadway (peripheral markings or lane markings) and for determining whether the vehicle will unintentionally leave the prescribed lane (i.e., without the direction indicator being set by the driver). Such systems are useful, in particular, if the driver is distracted by other activities (for example operation of the radio) or generally has problems in correctly following the course of the lane due to a lack of concentration. However, such systems do not serve to avoid collisions with vehicles travelling ahead but rather to avoid collisions that are due to the fact that the driver has unintentionally departed from the driver's own lane.

SUMMARY OF THE INVENTION

Generally speaking, it is an object of the present invention to provide a mechanism for avoiding collisions or for reducing the severity of collisions for vehicles, in particular for commercial vehicles, which at least reduces the disadvantages of the prior art and triggers warnings and/or autonomous emergency braking operations and/or avoidance manoeuvres in good time and only if the traffic situation actually requires it. In this context, it is also possible to take into account traffic in adjacent lanes.

In accordance with embodiments of the present invention, a sensing unit has one or more object-measuring systems and one or more image-processing video systems, in particular the lane camera of a lane departure warning system for determining the distance, width, relative speed, lateral offset and/or type of the objects in the vehicle surroundings. The use of object-measuring systems together with an image-processing video sykem provides, on the one hand, detection redundancy in determining the objects and the relevance thereof using different physical methods. Furthermore, this approach also permits what is referred to as data fusion. This permits, given a redundant locating process of the same object, the use of the respective best qualitative object signals. Compared to contemporary systems for warning of collisions or reducing the consequences of collisions, it therefore becomes possible to characterize objects more reliably and therefore to reduce the risk of incorrect interpretations. By virtue of expanded operational software, the data supplied by the video system, which is known from lane departure warning systems, can be used not only to determine the position and radius of the driver's own lane but also to determine the width, lateral offset, distance, relative speed and type of objects. The values obtained in this way for these variables can then be compared with those acquired using the object-measuring systems, which are known, for example, from CMS systems. The determination of the values of these variables on the basis of two different measuring principles increases the reliability of the data. Furthermore, the determination of these values is not generally restricted only to objects located in the driver's own lane. In this context, the present invention avoids the need to provide any additional surroundings sensor systems, instead using sensor systems that are usually already present for operating assistance and safety systems in commercial vehicles.

According to an embodiment of the invention, the object-measuring systems comprise a laser system. The use of laser systems provides a number of advantages such as are described below. In many cases, systems that are based on radar are used for determining the distance. Although radar provides the possibility of being able to measure the distance and relative speed precisely, it has, however, the disadvantage that, owing to its poor horizontal resolution, it can only provide extremely imprecise data in respect of the lateral offset and no information about the width of the object.

Advantageously, the laser system and the video system can be used multi-directionally. In this context, the laser system can comprise multiple multi-beam and/or scanning laser sensors and the video system can comprise multiple video cameras. However, for the examination of the redundant locating system by means of an object-measuring system in combination with a video system, as proposed herein, the two systems require as far as possible precise information about the position of the object so that it is ensured that the objects whose location is respectively determined are the same objects. Multi-beam and/or scanning laser sensors provide the possibility of configuring the object-measuring system such that it supplies more precise positional information on the detected object, which ultimately leads to improved availability and reliability of the redundant object detection. In this way, the surroundings of the driver's own vehicle in which the position and the speed of objects is to be determined can be defined precisely. Depending on the vehicle used and the aimed-at safety standard it may be appropriate also to sense objects that are farther away and that are still located behind the driver's own vehicle, in the driver's own lane as well as in adjacent lanes. The use of multi-directionally usable laser systems and video systems makes it possible to adapt the scanning in a flexible way to the requirements of the respective particular use by correspondingly selecting the number, orientation and range of the individual laser sensors and/or the scanned sector of the scanning laser sensors and of the individual video cameras.

In accordance with an embodiment of the present invention, a display device is employed for outputting a warning. The display device is preferably arranged in the cockpit of the vehicle so that the driver receives information to the effect that the traffic-situation-related characteristic value, which is determined by the control unit on the basis of the current traffic situation, has exceeded the traffic-situation-related threshold value that has been input. A rising traffic-situation-related characteristic value represents a current traffic situation that is becoming increasingly critical, resulting in the warning signals to the driver to initiate an action to mitigate the traffic situation, for example to reduce the speed, by reducing the position of the accelerator and/or initiating braking and/or an avoidance manoeuvre.

Embodiments of the invention advantageously include a brake system for activating brakes, wherein each brake can be activated individually and with differing degrees of intensity. The inclusion of a brake system makes it possible not only to output a warning to the driver but also to trigger braking autonomously, that is, without active intervention by the driver. Accidents that can arise from the driver ignoring or overlooking corresponding warnings can be prevented in this way. The possibility of activating each brake individually and with differing degrees of intensity provides the basis for the use of an electronic stability program ESP and/or of an anti-lock brake system ABS, with the result that the braking operation, which is performed autonomously, does not lead to instabilities of the vehicle. Such instabilities could, in turn, constitute further sources of hazards, for example in that the vehicle skids, can no longer keep to the lane or tips over.

One advantageous embodiment of the invention is characterized by an engine controller for controlling the torque output of an engine. If a braking operation is brought about autonomously, it is necessary to cancel the torque output by the engine for maximum braking effect. The engine controller must be capable of cancelling the torque output even if the driver is still activating the accelerator pedal or if a cruise controller is switched on.

An automated transmission for opening a clutch and for interrupting the torque flux when the brakes are activated is preferably provided. The interruption of the torque flux serves to ensure that the engine is not stalled during the braking operation so that the driver loses, for example, the power steering, or the driven wheels lock. The cancelling of the torque output, described above, even when the accelerator pedal is activated, means that, in this case, the engine is prevented from being over-revved. Instead, the engine controller will set an idling speed without the involvement of the driver.

A further embodiment of the present invention includes an automatic transmission having a torque converter for converting the torque flux. Instead of an automatic transmission with automatic activation of the clutch, it is also possible to use an automatic transmission having a torque converter. Although the torque flux from the engine to the wheels is not interrupted in such a transmission, the engine is also prevented from stalling by the slip that is possible in the torque converter, which is, for example, of hydraulic design.

One advantageous embodiment of the invention comprises a steering system. If the assistance system has detected that the traffic-situation-relative threshold value is exceeded, it is possible, in this embodiment, not only to bring about a warning to the driver and/or a braking operation but also to actively carry out an avoidance manoeuvre in case a collision with the vehicle travelling ahead can no longer be avoided by a braking operation.

A further aspect of the present invention relates to a method for avoiding collisions or for reducing the severity of collisions for vehicles, in particular commercial vehicles, comprising the following steps:

inputting traffic-situation-related criteria and determining at least one traffic-situation-related threshold value by means of an input unit, determining the distance, width, relative speed and lateral offset of the objects in relation to the vehicle by means of a sensing unit, determining the state of movement of the driver's own vehicle by means of a measuring unit, processing the data obtained from the input unit, the sensing unit and the speed-measuring unit, by means of a control unit to form at least one traffic-situation-related characteristic value, generating control signals for actuating built-in units, relating to the state of movement of the vehicle, by means of the control unit if a characteristic value or a plurality of characteristic values or all the characteristic values is/are above its/their respective threshold value or values, and outputting the generated control signals by means of the output unit to elements for influencing the movement of the vehicle, and to a display device.

Advantageously, the control signals can also be used to output a warning. This warning can be displayed to the driver of the vehicle, who is made aware of the fact that a critical traffic situation is present and a braking operation or an avoidance manoeuvre should be performed.

According to a further advantageous embodiment of the method according to the present invention, the warning can be output visually and/or acoustically and/or haptically. It can also be ensured in various ways that the driver does not ignore the warning. It is conceivable, for example, to output warning signals of the abovementioned type the intensity of which increases until the driver brings about a braking operation.

According to another advantageous embodiment of the method according to the invention, the control signals can be used to actuate a brake system for activating brakes, wherein each brake can be activated individually and with differing degrees of intensity.

It is also advantageous that the control signals can be used in an engine controller for controlling the torque output of an engine.

In yet another embodiment of the method according to the invention, the control signals can be used in an automated transmission for opening a clutch and for interrupting the torque flux when the brakes are activated.

In a further advantageous embodiment of the method according to the invention, the control signals can be used to actuate a steering system. For this purpose, the control signals advantageously comprise information about the current state of avoidance spaces for avoiding a collision. Avoidance spaces are understood to be nearby free spaces that a vehicle can use to avoid a collision.

It will be appreciated that the apparatus and the method corresponding to the preceding embodiments can also be adapted to the effect that, in addition to the driver's own movement path, the traffic situation on spaces disposed laterally next thereto is also monitored. A simple approach for triggering emergency braking is based on the idea that the driver's own vehicle will always have the necessary lateral space to be able to carry out an avoidance manoeuvre. Evaluation of the lateral avoidance spaces does not take place. As a result, in situations in which this space is actually not available, an emergency braking operation is always triggered too late. If the device/the method is used to the effect that it also monitors these lateral avoidance spaces, in cases where an avoidance manoeuvre is blocked laterally, the threshold value for triggering the emergency braking operation can be changed so that the emergency braking operation can take place in good time in order to completely avoid an accident.

A further aspect of the present invention is a computer program for avoiding collisions or for reducing the severity of collisions for vehicles, in particular commercial vehicles, that, when the computer program is executed, causes a computer to execute the following steps:

processing the information obtained from an input unit, from a sensing unit and from a measuring unit, wherein the information items obtained from the input unit relate to traffic-situation-related criteria and traffic-situation-related threshold values, the information items obtained from the sensing unit relate to the sensing of objects in the vehicle's surroundings, and the information items obtained by the measuring unit relate to the determination of the state of movement of the vehicle, and generating control signals for actuating built-in units that relate to the state of movement of the vehicle.

Both the method and computer program according to embodiments of the invention can be applied or used by employing the apparatus according to embodiments of the invention.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention will be explained in more detail by way of example with reference to the following drawings, in which.

DETAILED DESCRIPTION OF THE PREFERRED EMBODIMENTS

Figure 1:
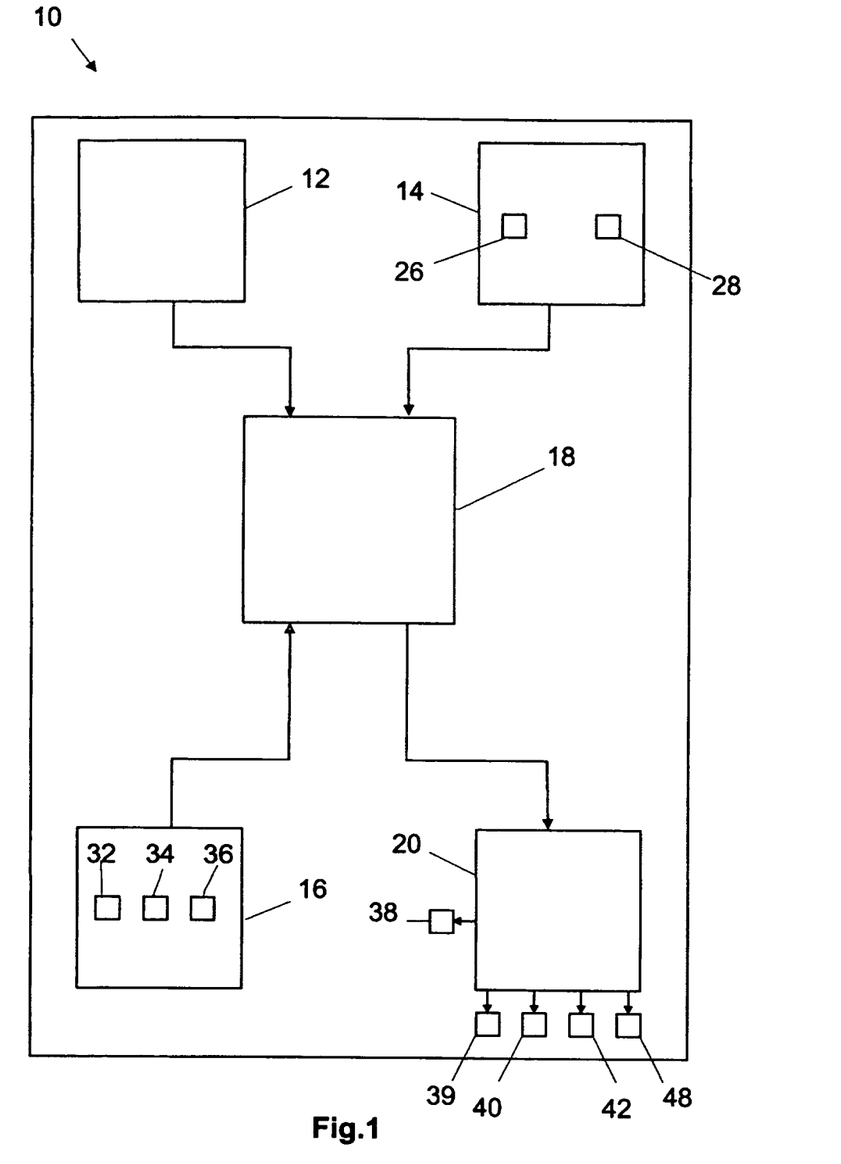
FIG. 1 is a block circuit diagram of a basic design of the apparatus according to an embodiment of the invention.

Referring now to the drawing figures, FIG. 1 illustrates the essential elements of an apparatus 10 according to an embodiment of the invention for avoiding collisions or for reducing the severity of collisions. For the sake of better comprehension of conceivable interactions of the apparatus 10 with components that relate to the state of movement of a vehicle 22, reference is also made at this point to FIG. 2.

The apparatus 10 comprises an input unit 12, a sensing unit 14, a measuring unit 16, a control unit 18 and an output unit 20.

The input unit 12 serves to input traffic-situation-related criteria and to determine traffic-situation-related threshold values. An input unit 12 may be embodied, for example, in the form of a diagnostic PC. A traffic-situation-related criterion may be, for example, an expected driver reaction time. Traffic-situation-related threshold values are subsequently determined from the traffic-situation-related criteria that are input. Furthermore, it is possible to select, by means of the input unit 12, which of the possible built-in units that relate to the state of movement of the vehicle are to be actuated by the apparatus 10.

Figure 3:
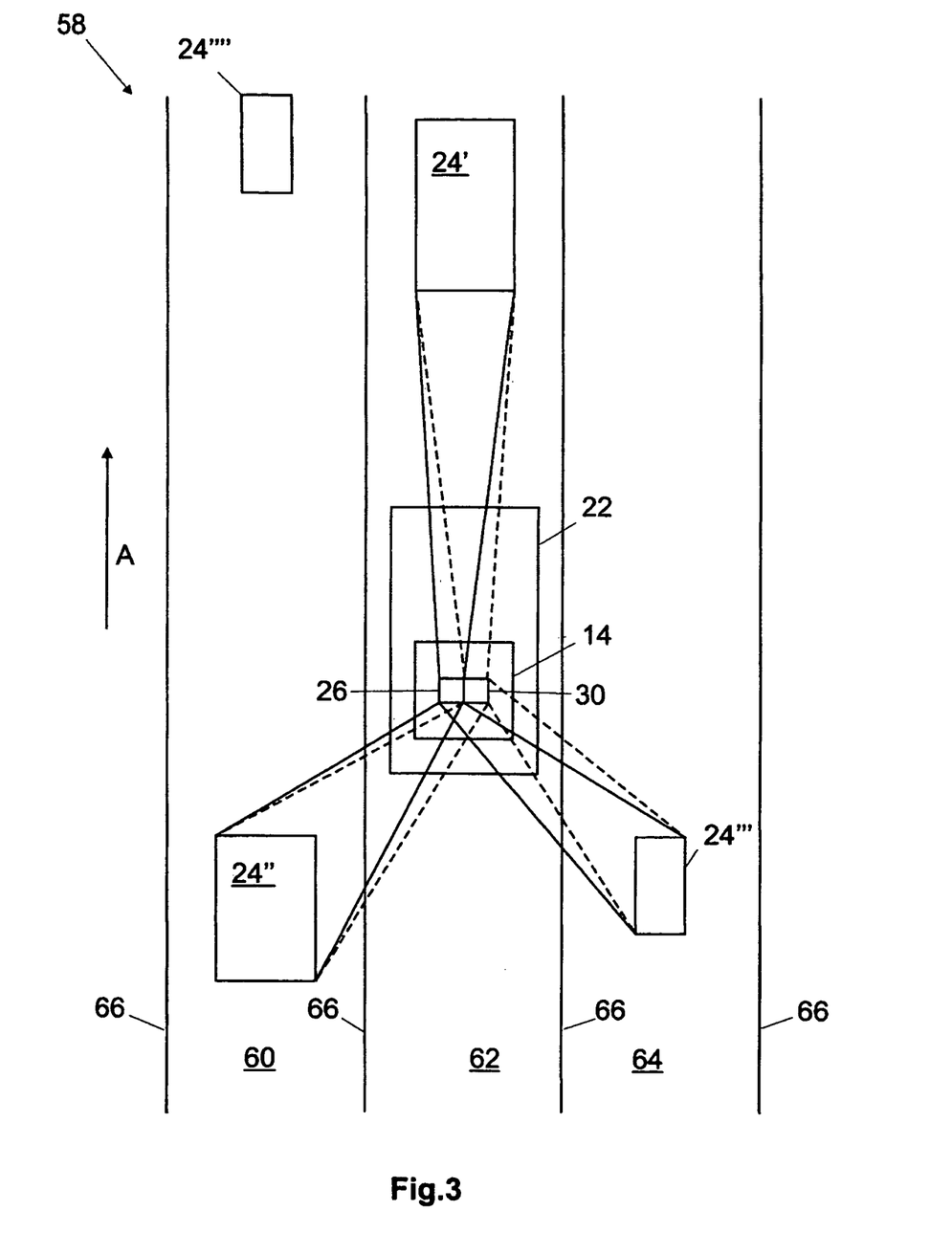
FIG. 3 is a schematic illustration of a possible traffic situation and the sensing thereof by means of the apparatus according to an embodiment of the invention.

Furthermore, the apparatus 10 comprises the sensing unit 14 for sensing objects 24 in the surroundings of the vehicle 22 (see FIG. 3). The objects 24 comprise, here, all the objects that have an influence on the current traffic situation, for example vehicles, pedestrians, motor cyclists and cyclists, crash barriers, pillars or road dividers. Hereinafter, for ease of discussion objects 24 will be assumed to be vehicles in the surroundings of the driver's own vehicle 22.

The sensing unit 14 has a video system 26 and an object-measuring system 28, for example a laser system 30. The distance, relative speed, width, lateral offset and type of objects 24 in the surroundings of the driver's own vehicle 22 can be determined with these components. The video system 26, which includes one or more video cameras, is already known from lane departure warning systems in which the lane can be determined, for example, by contrast jumps such as are caused, for example, by the edge of the roadway, roadway markings or crash barriers. Furthermore, the lane departure warning system is capable of establishing a relationship between the position of the driver's own vehicle 22 and the line and of outputting a warning if the vehicle 22 leaves the lane. Since the contrast may become worse depending on the time of day and the weather conditions (for example at night or in fog), very contrast-sensitive video cameras are used that can, in addition, also have night vision.

The measuring unit 16 is used to determine the state of movement of the vehicle 22. The measuring unit 16 can comprise a speed-measuring unit 32 for determining the vehicle speed, with all the devices that are suitable for determining the vehicle speed being considered. However, the vehicle speed should expediently be made available in an electronically processable form. The determination of the driver's own vehicle speed is highly significant, since, on the one hand, the speed of the objects 24 located in the surroundings of the driver's own vehicle 22 can only be determined when vehicle speed is known, and, on the other hand, because the driver's own speed has a considerable influence on the braking distance or avoidance distance and therefore on the possibilities for avoiding collisions. Furthermore, the measuring unit 16 comprises a unit 34 for determining the yaw rate. The yaw rate denotes the rotational speed of the vehicle 22 about its vertical axis. Furthermore, a sensor is provided for measuring the lateral acceleration 36. The state of movement of the vehicle 22 can therefore be determined with the variables of the vehicle speed, yaw rate and lateral acceleration such that it is possible to obtain definitive information as to whether a braking operation or an avoidance manoeuvre is at all possible and would not lead to instabilities of the vehicle 22, for example to skidding or to tipping over. These variables are already used by electronic stability programs ESP in order to keep the state of movement of the vehicle 22 in the stable range by selectively activating individual brakes 54 (FIG. 2) with differing degrees of intensity. Such systems are available today in commercial vehicles, so that an additional sensor system does not have to be constructed in this regard either.

The control unit 18 compares traffic-situation-related characteristic values, which the control unit 18 calculates from characteristic variables of the vehicle 22 and of the vehicle 24' travelling ahead, such as for example the movement variables, with the threshold values, which are supplied by the input unit 12. Depending on the result of this comparison, the control unit 18 generates corresponding control signals. In this context, it is assumed that a collision can take place only with the vehicle 24' travelling ahead and located in the direction of movement of the driver's own vehicle, and that this collision is to be avoided (cf. FIG. 3).

The output unit 20 of the apparatus 10 serves to output the control signals generated by the control unit 18. The output unit 20 has one or more terminals that can be connected to the built-in units that relate to the state of movement of the vehicle 22, so that the terminals can then be actuated by means of the control signals. In the illustrated example, the built-in unit in question is, inter alia, a display device 38, such as a warning lamp, which is arranged in the cockpit of the vehicle 22 and can alert the driver to a hazardous situation in a visual form (cf. also FIG. 2). Alternatively, the display device 38 can also comprise one or more acoustic active components (for example loudspeaker) or one or more vibration elements that alert the driver to a hazardous situation in an acoustic or haptic form.

Figure 2:
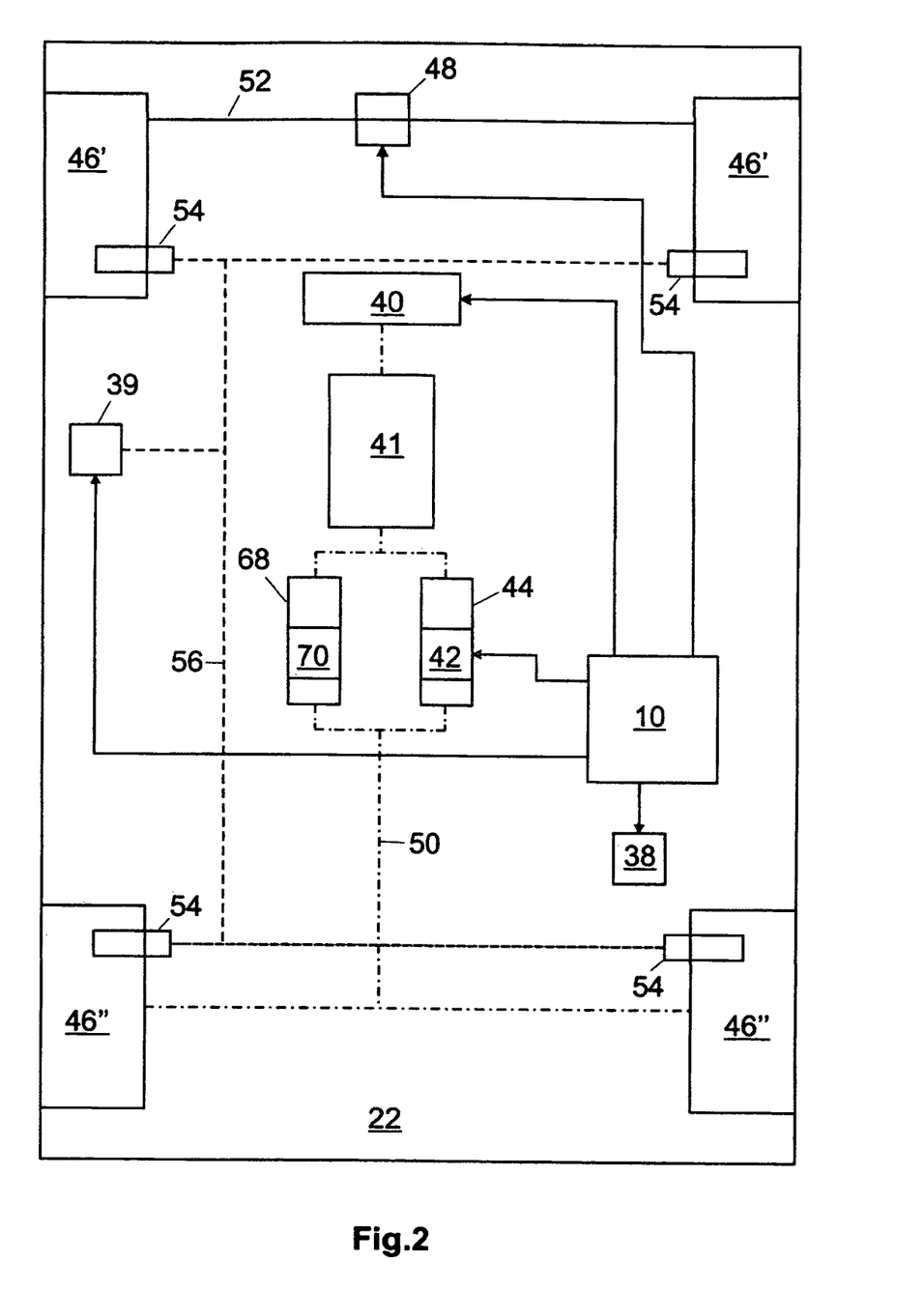
FIG. 2 is a schematic illustration of an advantageous arrangement of the apparatus according to an embodiment of the invention.

In the illustrated example, the output unit 20 is connected to a brake system 39, with the result that the control unit 18 can actuate the brake system 39 directly with the control signals generated by the control unit (cf. also FIG. 2). In this way, a braking operation can be brought about automatically without intervention by the driver when the control unit 18 arrives at a corresponding assessment of the current traffic situation. The brake system can, however, also be used for a form of haptic warning in that the control unit 18 requests a braking jolt for a short time period of, for example, 1 s.

Furthermore, an engine controller 40 is connected to the output unit 20. If the assessment of the current traffic situation has revealed that a braking operation is necessary to avoid a collision or to reduce the severity of a collision, a maximum deceleration can be brought about only if an engine 41, with which the driver's own vehicle 22 is driven, no longer outputs torque to wheels 46. The engine controller 40 is correspondingly actuated in the event of a braking operation being brought about by the apparatus 10, and the engine controller 40 prevents the torque output by the engine 41, with the result that the braking operation can be carried out with maximum deceleration. In this context, the torque output can also be interrupted when a torque is currently being requested, for example by the driver depressing the accelerator pedal, or by a cruise controller.

In the illustrated example, the output unit 20 is connected to a transmission controller 42 with a clutch (cf. also FIG. 2). In this case, an automated transmission 44 is used by means of which the torque is transmitted to the wheels 46. The clutch is configured such that it can be opened via the transmission controller 42 with corresponding control signals generated by the control unit 18, as a result of which the torque flux from the engine 41 to the wheels 46 of the vehicle 22 is interrupted. This ensures that when the clutch is opened, the engine 41 cannot be stalled owing to the low engine speeds forcibly brought about by the braking operation. This is significant, in particular, because the driver could lose power steering, which operates with motor force, or the driven wheels could lock. Furthermore, the driving comfort is increased in this way and largely interruption-free continuation of travel is made possible after an autonomous braking operation has been brought about and a collision has been avoided.

As an alternative to the transmission 44, it is also possible to use an automatic transmission 68 with a torque converter 70, which is subject to slip. In this case, it is not necessary to disconnect the drive train by means of a clutch since differences in the drive speeds and output speeds are compensated by slipping in the torque converter 70. The actuation of the transmission controller by the control unit 18 can be dispensed with in this case.

Furthermore, a steering system 48 can be connected to the output unit 20. The steering system 48 is capable of converting setpoint specifications for steering torques or steering angles autonomously and therefore permitting the control unit 18 to carry out an avoidance manoeuvre in order to avoid collisions or to reduce the severity of collisions. The control signals that are generated by the control unit 18 contain, in this case, on the one hand, information as to whether an avoidance manoeuvre can at all contribute to avoiding collisions or reducing the severity of collisions and, on the other hand, information as to the side on which an avoidance manoeuvre is to be carried out and which steering lock is ideal in order to be able to reliably carry out the avoidance manoeuvre. The steering system 48 carries out the steering interventions in accordance with this information. In this context, the system must be configured such that the steering movements of the driver are overridden or decoupled during the avoidance manoeuvre since in most cases the steering movements do not correspond to the steering movements predefined by the control unit 18. In addition to, or instead of, the steering lock, an avoidance manoeuvre can also be carried out by asymmetrical activation of the brakes 54 in order to generate a turning movement of the vehicle.

FIG. 2 is a schematic illustration of a possible arrangement of the apparatus 10 within a vehicle 22 and of possible built-in units that relate to the state of movement of the vehicle 22 and that can be actuated by means of the apparatus 10. The vehicle 22 comprises the wheels 46, wherein in the illustrated example the rear wheels 46" are driven by means of the motor 41 and either via the automated transmission 44 with the clutch or the automatic transmission 68 with the torque converter 70. The torque is conducted to the rear wheels 46" via the drive train 50, and an all-wheel drive is also conceivable in this context. The vehicle 22 is steered by means of the front wheels 46' using a steering means 52. The wheels 46 are equipped with brakes 54 in order to be able to decelerate the vehicle 22, with the brakes being connected to the brake system 39 via lines 56. The lines 56 can be of a pneumatic or electrical type, with the brake system 39 being capable of actuating each brake 54 individually and with differing degrees of intensity. As has already been stated above, the apparatus 10 is connected to the display device 38, the brake system 39, the steering system 48 and the transmission controller 42, with the result that the state of movement of the vehicle 22 can be influenced independently of the driver in the way explained above in accordance with the assessment of the traffic situation determined by the apparatus 10.

FIG. 3 illustrates a typical traffic situation on a multi-lane single-direction roadway 58 that comprises three lanes, a left-hand lane 60, a central lane 62 and a right-hand lane 64. An object 24' is located in the lane 62, an object 24" and an object 24"" are located in the left-hand lane 60, and an object 24'" is located in the right-hand lane 64. In the illustrated example, the objects 24 are to be vehicles, without exceptions. The driver's own vehicle 22 is located in the central lane 62. All the vehicles 22 and 24 move in the direction of the arrow A. The objects 24 located within the range of the video system 26 and of the laser system 30 are sensed thereby using the sensing unit 14. FIG. 3 illustrates the object-related sensing sectors of the video system 26 as continuous lines, and those of the laser system 30 as dashed lines. In the illustrated example, all the vehicles 24 are located within the range of the sensing unit 14. Vehicles located outside the range are not sensed and are not taken into account in the calculations of the traffic-situation-related characteristic values. The range and the sector within which the objects 24 can be sensed can be set individually. A plurality of laser sensors can be oriented such that objects within their range can be sensed independently of their angular position with respect to the vehicle 22. It may also be sufficient to limit the sensing of objects to a specific sector. Objects located in the driver's own lane directly behind the driver's own vehicle 22 have a subordinate roll for the avoidance of collisions, so that it is acceptable to ignore them.

The video systems 26, which are known from the lane departure warning systems, monitor the sector lying ahead of the vehicle 22, and such sector can be larger or smaller depending on the optics used in the video camera. In general, in lane departure warning systems it is sufficient to use a video camera. In order to increase the size of the sector that can be sensed, it is possible to use a plurality of video cameras so that the sectors that are sensed by the laser system 30 and by the video system 26 are congruent.

The video systems 26, which are known from the lane departure warning systems, use, inter alia, contrast jumps generated by roadway markings 66 or edges of roads in order to determine the lane. The sensing of the object 24 by means of the video system 26 according to an embodiment of the invention also uses, inter alia, this type of image processing. However, it is also possible to use other methods, such as for example the determination of the optical flow. These processing steps serve, inter alia, to determine the distance, width, lateral offset and type of the objects 24. It is therefore not necessary to construct an additional surroundings sensor system.

The data supplied by the video system 26 and by the laser system 30 are fed to the control unit 18. The position of the sensed objects 24 can be determined such that it is possible to assign them to one of the lanes 60, 62, 64 or to the driver's own movement path, which does not have to be identical to a lane. As a result of the objects 24 being detected both by the video system 26 and by the laser system 30, a redundancy is generated which leads to more reliable and more precise determination of the position variables and movement variables as well as of the dimensions.

Figure 4:
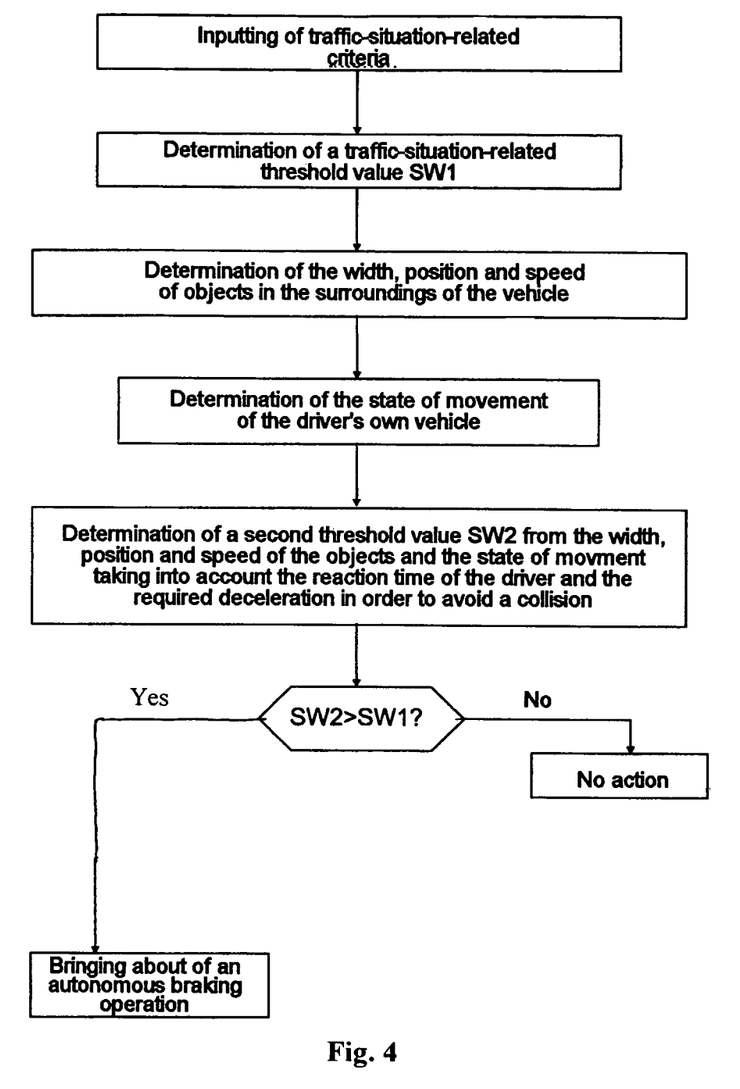
FIG. 4 is a flowchart of an advantageous algorithm of the method or the computer program according to an embodiment of the invention.

FIG. 4 is a flowchart of a method and computer program according to an embodiment of the invention, with the aim here being exclusively to bring about an autonomous braking operation in order to avoid a collision, without an active steering intervention being performed. The first step is to determine a traffic-situation-related threshold value. This value is determined on the basis of instructions that have been executed via the input unit 12, and can take into account individual habits of the driver. Furthermore, the threshold value can take into account how heavily the vehicle 22 is loaded and whether a trailer is carried along with what load. Furthermore, information related to the state of the road and state of the weather, for example the external temperature, can also be included in the determination of the threshold value. Since the last-mentioned variables can change during a journey or between multiple journeys (for example due to loading/un-loading), these values should be automatically adapted, with the result that the threshold value is updated at regular intervals.

The determination of a traffic-situation-related characteristic value then starts using the control unit 18. Here, the information that has already been determined for the determination of the threshold value, in particular also relating to the load, the towing of a trailer, the state of the road and of the weather, is taken into account. In addition, the information about the state of movement of the driver's own vehicle 22 and the data, supplied by the sensing unit 14, relating to the distance, relative speed, lateral offset, width and type of the sensed objects 24 in the surroundings of the vehicle 22 are included in the determination of the characteristic value. A deceleration that is required to avoid the collision is determined taking into account the reaction time of the driver, and the possibility of implementing an avoidance manoeuvre is estimated. This information is also included in the determination of the characteristic value, which is continuously updated so that the current traffic situation, the state of movement and the state of the road and of the weather are always taken into account correctly.

The characteristic value and the threshold value preferably have the same format so that the control unit 18 can always compare them. The control unit 18 carries out a continuous comparison between the characteristic value and the threshold value. If the characteristic value does not exceed the threshold value, no action is brought about. If the characteristic value is, however, greater than the threshold value, the control unit 18 brings about an action, in this example the performance of an autonomous braking operation.

This will be explained in more detail in relation to FIG. 3. Here, it is assumed that the vehicles 24" and 24''' which are located in the left-hand lane 60 are at a higher speed, and the vehicle 24''' located in the right-hand lane 64 is at a lower speed than the driver's own vehicle 22. Furthermore it is to be assumed that the vehicle 24' travelling ahead suddenly decelerates. The apparatus according to embodiments of the invention registers that the distance between the driver's own vehicle 22 and the vehicle 24' travelling ahead decreases owing to the deceleration. As a result, the criticalness of the traffic situation, that is, the probability of a collision, increases, which is represented by an increasing characteristic value. However, the apparatus detects that there is an avoidance possibility by the driver of the vehicle in question moving out into the right-hand lane 64. If there is still sufficient time to initiate a corresponding avoidance manoeuvre, the characteristic value increases, but does not exceed the threshold value. The apparatus consequently does not bring about any braking operation. If the driver carries out a corresponding avoidance manoeuvre and changes into the right-hand lane 64, the characteristic value drops, since there is then no vehicle in front of the vehicle 22. If the driver does not perform an avoidance manoeuvre and does not bring about a braking operation, or does not bring about a sufficiently strong braking operation, the distance from the vehicle 24' travelling ahead decreases further, so that starting from a certain point in time there is no longer any time to carry out an avoidance manoeuvre. A collision can then only be avoided with a braking operation. Starting from this point in time, the characteristic value exceeds the threshold value, and the apparatus brings about an autonomous braking operation or amplifies the braking intervention in order to avoid a collision.

Figure 5:
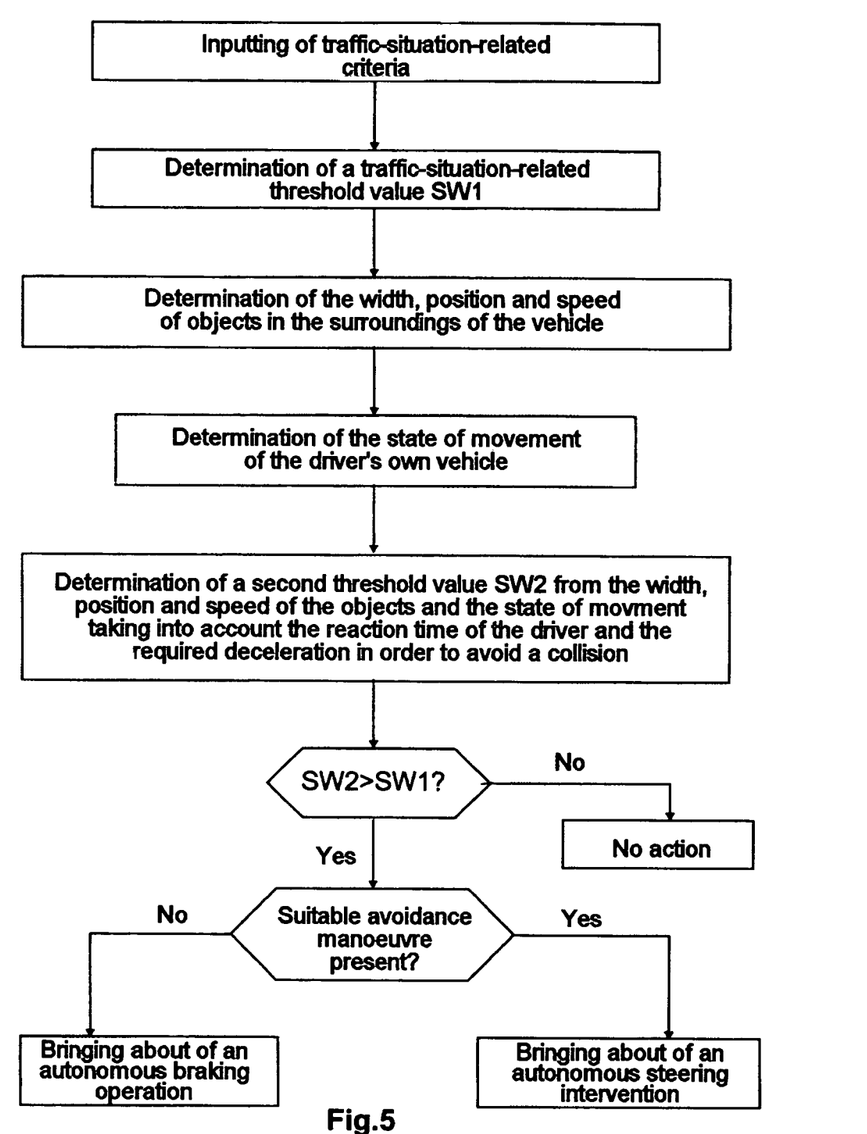
FIG. 5 is a further flowchart of a further advantageous algorithm of the method or the computer program according to an embodiment of the invention.

FIG. 5 is a flowchart of the method or computer program according to an embodiment of the invention wherein an active steering intervention can be performed. In contrast to the flowchart of FIG. 4, a first and a second threshold value are determined here. The inputting and the determination of the first threshold value can be done in a way that is analogous to the case illustrated in FIG. 4. Starting from the first threshold value, the second threshold value additionally contains information as to whether an avoidance space for avoiding the collision is present or not. This information is made available separately to the control unit 18 independently of the threshold values and characteristic values so that an interrogation about the presence of an avoidance space can be carried out. For the determination of the second threshold value, not only is the current traffic situation taken into account, that is, whether a lane change is possible or not at a given time, but also how a lane change will affect the future traffic situation. It is then possible to assess whether or not a possible avoidance manoeuvre will actually contribute to the avoidance of a collision. An avoidance manoeuvre that results in a collision with an object on the adjacent lane in order to avoid a collision in the driver's own lane is to be avoided. In particular, avoidance manoeuvres that would lead to collisions with pedestrians or motor cyclists or cyclists or that use unsuitable lanes, such as cycle paths or pavements, are to be prevented. A steering intervention is performed only if an avoidance space for avoiding a collision is actually present. According to the flowchart of FIG. 5, a steering intervention is not triggered until both the first and the second threshold values are exceeded by the characteristic value, in which case the second threshold value is equal to or larger than the first threshold value. However, this requirement is not compulsory and other conditions for bringing about a steering intervention are conceivable. A significant aspect here is whether efforts are aimed at triggering a braking operation or rather a steering intervention.

If there is no avoidance possibility, an autonomous braking operation is brought about but no steering intervention is performed, as already described in the example above. Depending on the traffic situation, it may be necessary also to bring about a braking operation in addition to the steering intervention. This could be the case when the avoidance manoeuvre can no longer be carried out in such good time as to prevent a collision when the speed is unchanged.

The behavior of the apparatus 10 with the option of a steering intervention will now be explained, again in relation to the traffic situation illustrated in FIG. 3. The preconditions are to be the same as those presented above. The characteristic value increases as a result of the deceleration of the vehicle 24'. If the characteristic value exceeds the first threshold value and if no suitable avoidance manoeuvre is presented, the control unit 18 brings about an autonomous braking operation. However, if the apparatus detects that an avoidance possibility is present both in the left-hand lane 60 and the right-hand lane 64, first no action is triggered even though the first threshold value is exceeded. The apparatus registers that an avoidance manoeuvre could be carried out into the left-hand lane 60 to avoid a collision with the vehicle 24", since the vehicle 24" is travelling at a higher speed than the driver's own vehicle 22. Therefore, the lane 60 cannot be used as an avoidance space, with the result that the apparatus rules out a change of lane into the lane 60 and prepares for a change into the lane 64, which constitutes an avoidance space since the vehicle 24''' is travelling more slowly than the driver's own vehicle 22. If the characteristic value then exceeds the second threshold value owing to the continuing deceleration of the vehicle 24', the apparatus initiates an avoidance manoeuvre into the lane 64 through an autonomous steering intervention. If the characteristic value does not decrease despite the avoidance manoeuvre, for example as a result of 24' decelerating even more strongly or rotating due to an instability, so that a collision cannot be prevented with the avoidance manoeuvre alone, the apparatus can bring about a braking operation in addition to the steering intervention.

In the illustrated example, no action is brought about if a suitable avoidance manoeuvre is presented but the characteristic value exceeds the first threshold value but not the second. However, since the traffic situation has already reached a certain level of criticalness, the control unit can in this case also be configured such as to bring about an autonomous braking operation.

With the embodiments of the inventive apparatus, method and computer program, the possibility is provided of avoiding collisions or of reducing the severity of collisions. The inventive embodiments are not restricted to the examples illustrated here. The claimed scope of protection also comprises all possible variations and refinements that result from the basic concept on which the present invention is based. It is therefore possible also to use other measurement methods than those presented to determine the distance, width, position, relative speed and type of objects in the driver's own direction of movement, or to employ them in addition to those presented. It would be conceivable here to sense the surroundings of the vehicle by means of satellite navigation. If trailers are being towed, the laser systems and the video systems can also extend to the trailer. Such variations and refinements do not go beyond the basic concept of the present invention.

Thus, it will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A collision avoidance/mitigation system for a vehicle, comprising:
    an input unit configured for inputting traffic-situation-related criteria and for determining traffic-situation-related threshold values;
    a sensing unit configured to sense objects in the vehicle surroundings, the sensing unit including at least one object-measuring system and at least one image-processing video system configured to determine the distance, width, relative speed, lateral offset and type of the surrounding objects;
    a measuring unit configured to determine the state of movement of the vehicle;
    a control unit configured to process information obtained from the input unit, the sensing unit and the measuring unit, and to generate control signals for actuating vehicle units that relate to the state of movement of the vehicle;
    an output unit for outputting the generated control signals;
    a brake system configured to automatically actuate brakes of the vehicle without driver intervention in response to the generated control signals; and
    an automated transmission configured to open a clutch and to interrupt torque flux in response to the brakes being actuated without driver intervention based on the control signals.

2. The system according to claim 1, wherein the at least one object-measuring system is a laser system.

3. The system according to claim 2, wherein the laser system and the at least one image-processing video system are configured for multi-directional operation.

4. The system according to claim 1, further comprising a display device for outputting a warning.

5. The system according to claim 1, wherein each of the brakes is individually actuatable with differing degrees of intensity.

6. The system according to claim 5, further comprising an engine controller for controlling the torque output of an engine of the vehicle.

7. The system according to claim 5, further comprising an automatic transmission having a torque converter configured to convert torque flux.

8. The system according to claim 5, further comprising a steering system.

9. The system according to claim 1, wherein the at least one image-processing video system includes a lane camera of a lane departure warning system.

10. A vehicle, comprising a collision avoidance/mitigation system according to claim 1.

11. A collision avoidance/mitigation method for a vehicle, comprising the steps of:
    inputting traffic-situation-related criteria and determining at least one traffic-situation-related threshold value using an input unit;
    determining the distance, width, relative speed, lateral offset and type of objects in the vehicle surroundings using a sensing unit;
    determining the state of movement of the vehicle using a measuring unit;
    using a control unit, processing the at least one traffic-situation-related threshold value, the distance, width, relative speed, lateral offset and type of objects, and the state of movement of the vehicle to determine a traffic-situation-related characteristic value;
    generating control signals for actuating an autonomous braking operation using the control unit when the characteristic value exceeds the traffic-situation-related threshold value;
    outputting the control signals using an output unit to vehicle elements that influence the movement of the vehicle, and to a display device;
    actuating brakes of a brake system of the vehicle based on the control signals; and
    opening a clutch and interrupting torque flux in response to the brakes of the vehicle being actuated without driver intervention based on the control signals.

12. The method according to claim 11, further comprising the step of outputting a warning based on the control signals.

13. The method according to claim 12, wherein the warning is at least one of visual, audible and haptic.

14. The method according to claim 11, wherein each of the brakes is individually actuatable with differing degrees of intensity.

15. The method according to claim 11, wherein the vehicle has an engine controller, and further comprising the step of controlling the torque output of an engine of the vehicle based on the control signals.

16. The method according to claim 11, further comprising the step of actuating a steering system of the vehicle based on the control signals.

17. The method according to claim 16, wherein the control signals include information about a current state of avoidance spaces for avoiding a collision.

18. A computer program product comprising a computer usable physical medium storing a computer executable program to:
- process information obtained from an input unit of a collision avoidance/mitigation apparatus of a vehicle relating to traffic-situation-related criteria and traffic-situation-related threshold values;
- process information relating to objects in the surroundings of the vehicle obtained from a sensing unit of the collision avoidance/mitigation apparatus;
- process information relating to the determination of the state of movement of the vehicle obtained from a measuring unit, of the collision avoidance/mitigation apparatus;
- generate control signals for actuating vehicle units that relate to the state of movement of the vehicle;
- actuate brakes of a brake system of the vehicle based on the control signals; and
- open a clutch and interrupting torque flux in response to the brakes of the vehicle being actuated without driver intervention based on the control signals.

19. A data processor for a vehicle collision avoidance/mitigation system, the data processor comprising a computer executable program to:
- process information relating to traffic-situation-related criteria and traffic-situation-related threshold values obtained from an input unit;
- process information relating to objects in the surroundings of the vehicle obtained from a sensing unit;
- process information relating to the determination of the state of movement of the vehicle obtained from a measuring unit of the collision avoidance/mitigation apparatus;
- generate control signals for actuating vehicle units that relate to the state of movement of the vehicle;
- actuate brakes of a brake system of the vehicle based on the control signals; and
- open a clutch and interrupting torque flux in response to the brakes of the vehicle being actuated without driver intervention based on the control signals.

* * * * *

UNITED STATES PATENT AND TRADEMARK OFFICE
CERTIFICATE OF CORRECTION

PATENT NO.         : 8,538,674 B2
APPLICATION NO.    : 12/735217
DATED              : September 17, 2013
INVENTOR(S)        : Breuer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 374 days.

Signed and Sealed this

Fifteenth Day of September, 2015

Michelle K. Lee
*Director of the United States Patent and Trademark Office*